United States Patent
Minami et al.

(10) Patent No.: US 10,814,436 B2
(45) Date of Patent: Oct. 27, 2020

(54) JOINED BODY INCLUDING CERAMIC MEMBER AND METALLIC MEMBER AND METHOD FOR MANUFACTURING JOINED BODY

(71) Applicant: NGK INSULATORS, LTD., Nagoya (JP)

(72) Inventors: Tomoyuki Minami, Handa (JP); Tetsuya Kawajiri, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 130 days.

(21) Appl. No.: 15/332,129

(22) Filed: Oct. 24, 2016

(65) Prior Publication Data

US 2017/0036961 A1 Feb. 9, 2017

Related U.S. Application Data

(63) Continuation of application No. PCT/JP2015/061334, filed on Apr. 13, 2015.

(30) Foreign Application Priority Data

Apr. 30, 2014 (JP) ................. 2014-093587

(51) Int. Cl.
*B23K 35/30* (2006.01)
*B32B 7/00* (2019.01)
(Continued)

(52) U.S. Cl.
CPC .......... *B23K 35/3006* (2013.01); *B32B 9/041* (2013.01); *B23K 2103/52* (2018.08);
(Continued)

(58) Field of Classification Search
None
See application file for complete search history.

(56) References Cited

U.S. PATENT DOCUMENTS

| 6,436,545 B1 | 8/2002 | Tanahashi et al. |
| 2014/0037492 A1* | 2/2014 | Kishimoto ............ C04B 37/006 420/502 |

(Continued)

FOREIGN PATENT DOCUMENTS

| JP | H03-261669 | * 11/1991 |
| JP | H05-024943 | 2/1993 |

(Continued)

OTHER PUBLICATIONS

English machine translation of JP 2013-193935, EPO, accessed Oct. 3, 2018.*

(Continued)

*Primary Examiner* — Xiaobei Wang
(74) *Attorney, Agent, or Firm* — Burr & Brown, PLLC

(57) ABSTRACT

A joined body 10 is manufactured by joining a Mo- or Ti-made terminal 14 having a Ni coating, a Au coating, a Ni—Au coating (with Ni Serving as a base) to a recess 12a formed in a plate-shaped ceramic member 12 made of alumina or aluminum nitride through a joint layer 16. The joint layer 16 contains Au, Sn, Ag, Cu, and Ti and is in contact with a bottom surface of the recess 12a and with at least part of a side surface of the recess 12a (the entire side surface in this case). In the joint layer 16, its joint interface with the ceramic member 12 is Ti-rich. When the joined body 10 is cut in its thickness direction, the ratio of the total cross sectional area of pores to the cross-sectional area of the joint layer 16 (porosity) is 0.1 to 15%.

5 Claims, 2 Drawing Sheets

(51) Int. Cl.
 B32B 9/04 (2006.01)
 *C22C 5/08* (2006.01)
 *B23K 103/00* (2006.01)

(52) U.S. Cl.
 CPC ..... *B32B 2255/06* (2013.01); *B32B 2255/205* (2013.01); *C04B 2235/6581* (2013.01); *C04B 2237/12* (2013.01); *C04B 2237/125* (2013.01); *C04B 2237/126* (2013.01); *C04B 2237/127* (2013.01); *C04B 2237/343* (2013.01); *C04B 2237/366* (2013.01); *C04B 2237/408* (2013.01); *C04B 2237/55* (2013.01); *C04B 2237/597* (2013.01); *C04B 2237/704* (2013.01); *C04B 2237/708* (2013.01); *C04B 2237/72* (2013.01); *C04B 2237/84* (2013.01); *C22C 5/08* (2013.01)

(56) References Cited

U.S. PATENT DOCUMENTS

| | | | |
|---|---|---|---|
| 2014/0126155 A1* | 5/2014 | Imamura | B23K 35/3006 361/715 |
| 2014/0127484 A1* | 5/2014 | Minami | B32B 7/045 428/209 |

FOREIGN PATENT DOCUMENTS

| | | | |
|---|---|---|---|
| JP | H05-139856 | * | 6/1993 |
| JP | 2000-219578 | A1 | 8/2000 |
| JP | 2004-059375 | A1 | 2/2004 |
| JP | 2010-076948 | A1 | 4/2010 |
| JP | 2013-193935 | A1 | 9/2013 |

OTHER PUBLICATIONS

Sechi et al., "Dissimilar laser brazing of boron nitride and tungsten carbide", Materials and Design, vol. 31, pp. 2071-2077, Oct. 9, 2009. (Year: 2009).*
Andrieux et al., "Details on the formation of Ti2Cu3 in the Ag—Cu—Ti system in the temperature range of 790-860 C", J of Phase Equilibria, vol. 29 Issue 2, pp. 156-162, 2009. (Year: 2009).*
International Search Report and Written Opinion (Application No. PCT/JP2015/061334) dated May 19, 2015.
English translation of International Preliminary Report on Patentability (Chapter I) (Application No. PCT/JP2015/061334) dated Nov. 10, 2016, 13 pages.
Korean Office Action (Application No. 10-2016-7029947) dated Sep. 12, 2017 (with English translation).
"Welding Handbook (vol. 2)," edited by the Welding Society of the Chinese Mechanical Engineering Society, China Machine Press, Jan. 2008, pp. 1188-1189.
Chinese Office Action (Application No. 201580023187X) dated Apr. 2, 2019 (with English translation).

* cited by examiner

JOINED BODY INCLUDING CERAMIC MEMBER AND METALLIC MEMBER AND METHOD FOR MANUFACTURING JOINED BODY

BACKGROUND OF THE INVENTION

1. Field of the Invention

The present invention relates to a joined body including a ceramic member and a metallic member and to a method for manufacturing the joined body.

2. Description of the Related Art

In one known joined body including a ceramic member and a metallic member, an end portion of the metallic member is joined to the ceramic member through a joint portion (PTL 1). In this joined body, the joint portion includes a metallized layer formed on the ceramic member and a brazing joint layer intervening between the metallized layer and the end portion of the metallic member. Such a joined body is manufactured in the following manner. First, a ring-shaped first brazing material containing Cu—Al—Si——Ti is placed on a joint surface of a disk-shaped ceramic member formed from an AlN sintered body. Next, the first brazing material is heated in a vacuum atmosphere at 1,050° C. for 5 minutes to form a metallized layer. Then a ring-shaped second brazing material containing Ag—Cu is placed on the metallized layer. An end face of a tubular metallic member is placed on the second brazing material, and a weight is placed on the metallic member. These components are heated in a vacuum atmosphere at 800° C. for 5 minutes to form a brazing joint layer. In the thus-obtained joined body, the amount of helium leakage is almost zero. Even after thermal cycles, no cracking occurs, and the amount of helium leakage is almost zero.

CITATION LIST

Patent Literature

JP 2000-219578 A

SUMMARY OF INVENTION

However, in the above joined body, sufficient strength is not obtained in some cases.

The present invention has been made in order to solve the above problem, and it is a principal object to sufficiently increase the strength of a joined body obtained by joining a ceramic member and a metallic member together.

The joined body of the present invention comprises:

a ceramic member made of alumina or aluminum nitride and having a recess; and a Mo- or Ti-made metallic member having a Ni coating, a Au coating, or a Ni—Au coating (with Ni serving as a base) and joined to the recess of the ceramic member through a joint layer;

wherein the joint layer contains Au, Sn, Ag, Cu, and Ti and is in contact with a bottom surface of the recess and with at least part of a side surface of the recess, wherein, in the joint layer, a joint interface with the ceramic member is Ti-rich, and, wherein, when the joined body is cut in a thickness direction of the joined body, the ratio of the total cross sectional area of the pores to the cross-sectional area of the joint layer (porosity) is 0.1 to 15%.

This joined body includes the ceramic member and the metallic member that are joined together, and the strength of the joined body is Sufficiently high,. The reason for this may be as follows. The joint layer containing Au, Sn, Ag, Cu, and Ti is considered to be preferable for joining the ceramic member made of alumina or aluminum nitride to the Mo- or Ti-made metallic member having a Ni coating, a Au coating, or a Ni—Au coating (with Ni serving as a base). Since the joint interface of the joint layer that is joined to the ceramic member is Ti-rich, Ti reacts with the ceramic at the joint interface and may serve to anchor the joint layer. Since the porosity is 0.1 to 15%, the strength is high at the beginning and also after thermal cycles, and the occurrence of cracking can be prevented. A porosity of less than 0.1% is not preferred because cracking occurs and the strength after thermal cycles becomes significantly lower than that at the beginning. A porosity of more than 15% is also not preferred because the strength becomes extremely low.

Preferably, in the joined body of the present invention, Ti aggregates around the pores present inside the joint layer. The aggregation of Ti can be checked on a Ti mapping image of a cross section of the joined body that is obtained by cutting it in its thickness direction.

A method for manufacturing a joined body according to the present invention comprises the steps of:

(a) preparing a ceramic member made of alumina or aluminum nitride and having a recess;

(b) applying a Ag—Cu—Ti paste to a bottom surface of the recess and at least part of a side surface of the recess and heating the resulting ceramic member to 800° C. to 900° C. in a vacuum atmosphere to thereby form a metallized layer on the bottom surface of the recess and the at least part of the side surface of the recess; and (c) placing a Au—Sn sheet on the bottom surface of the recess with the metallized layer formed thereon, placing a Mo- or Ti-made metallic member having a Ni coating, a Au coating, or a Ni—Au coating (with Ni serving as a base) on the Au—Sn sheet, and heating the resulting ceramic member and the metallic member to 290 to 420° C. in a vacuum atmosphere to thereby form, between the metallic member and the ceramic member, a joint layer in which the metallized layer and the Au—Sn sheet are mixed and integrated together.

With this joined body manufacturing method, the joined body obtained has sufficiently high strength. This manufacturing method is suitable for manufacturing the above-described joined body.

Preferably, in step (b) in the method for manufacturing a joined body according to the present invention, the metallized layer has a thickness of 5 to 75 μm. This allows the strength of the joined body to be further increased. In addition, the occurrence of cracking in the ceramic member can be prevented.

Preferably, in step (b) in the method for manufacturing a joined body according to the present invention, the Ag—Cu—Ti paste contains 1.50 to 2.10 wt % of Ti. If the content of Ti is lower than the lower limit, the strength of the obtained joined body after thermal cycles may become lower than the strength at the beginning, or cracking may occur after thermal cycles. If the content of Ti is more than the upper limit, the strength of the joined body obtained may be small at the beginning and also after thermal cycles (no cracking, however, occurs).

DETAILED DESCRIPTION OF THE INVENTION

A preferred embodiment of the present invention will next be described with reference to the drawings. FIGS. 1A to 1D show a process chart for manufacturing a joined body 10 in the present embodiment.

Figure 1A:
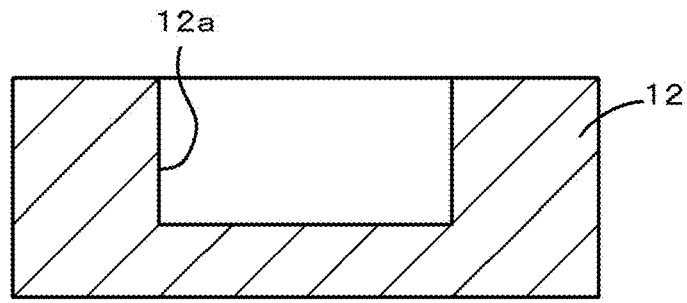
FIGS. 1A to 1D show a process chart for manufacturing a joined body 10.
Figure 1B:
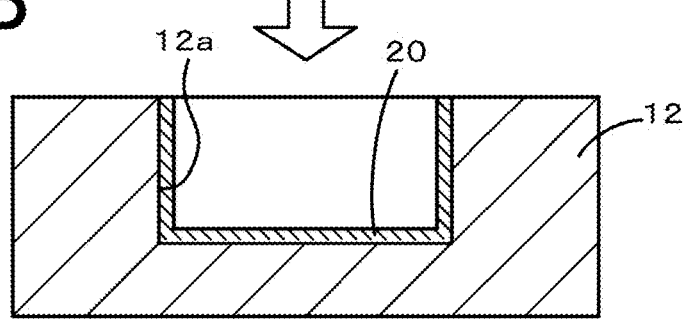
Figure 1C:
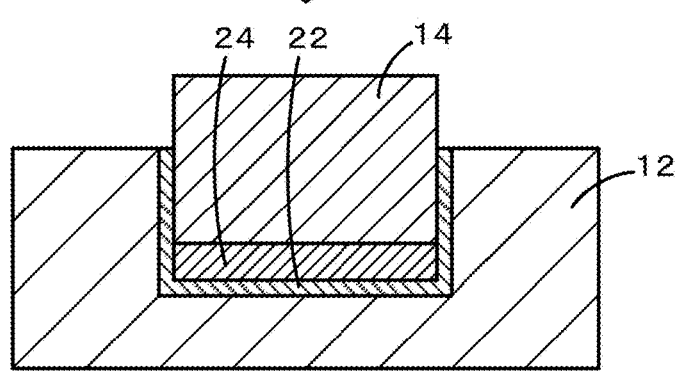
Figure 1D:
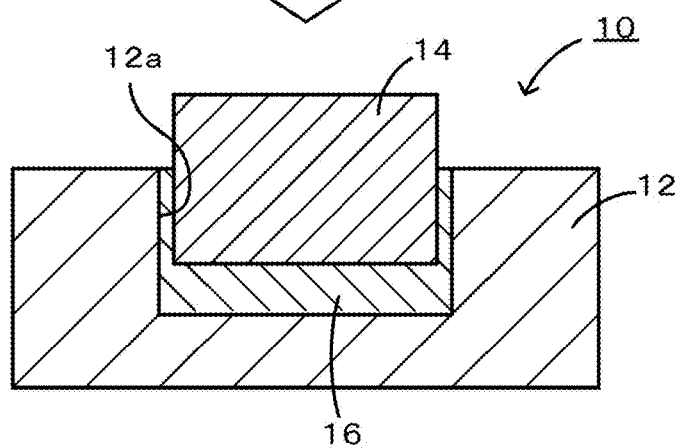

As shown in FIG. 1D, the joined body 10 in the present embodiment is manufactured by joining a Mo- or Ti-made terminal 14 having a Ni coating, a Au coating, a Ni—Au coating (with Ni serving as a base) to a recess 12a formed in a plate-shaped ceramic member 12 made of alumina or aluminum nitride through a joint layer 16. The joint layer 16 contains Au, Sn, Ag, Cu, and Ti and is in contact with a bottom surface of the recess 12a and with at least part of a side surface of the recess 12a (the entire side surface in this case). In the joint layer 16, its joint interface with the ceramic member 12 is Ti-rich. When the joined body 10 is cut in its thickness direction, the ratio of the total cross sectional area of pores to the cross-sectional area of the joint layer 16 (porosity) is 0.1 to 15%.

The pores can be identified as dark portions when the cross section of the joint layer 16 is binarized. For example, the binarization may be performed by generating a brightness histogram of pixels of the entire cross section of the joint layer 16, setting, as a threshold, a brightness value at a position between two peaks (i.e., in a valley) in the histogram, and assigning 0 to pixels with a brightness less than the threshold and 255 to pixels with a brightness equal to or more than the threshold. In Examples described later, the binarization was performed with the brightness threshold set to 80 to compute the porosity.

The above joined body 10 can be manufactured, for example, as follows. First, a ceramic member 12 having a recess 12a is prepared (see FIG. 1A). Next, a Ag—Cu—Ti paste 20 is applied to the bottom surface of the recess 12a and at least part of its side surface. After completion of the application of the Ag—Cu—Ti paste 20, the paste is dried and heated to 800 to 900° C. in a vacuum atmosphere to bake the paste (see FIG. 1B). As a result of this process, a metallized layer 22 is formed on the bottom surface of the recess 12a and the at least part of its side surface. A baking temperature of lower than 800° C. is not preferred because the reactivity of the paste is low. A baking temperature of higher than 900° C. is not preferred because the amount of a reaction product increases and residual stress increases due to an increase in the difference in thermal expansion and an increase in Young's modulus, causing cracking or a reduction in strength. Then a Au—Sn sheet 24 is placed on the bottom surface of the recess 12a with the metallized layer 22 formed thereon (see FIG. 1C). Then the terminal 14 is placed on the Au—Sn sheet 24, and an unillustrated weight is placed on the terminal 14. The resulting ceramic member 12 and terminal 14 are heated to 290 to 420° C. in a vacuum atmosphere. A joint layer 16 in which the metallized layer 22 and the Au—Sn sheet 24 are mixed and integrated together is thereby formed between the terminal 14 and the ceramic member 12. The joined body 10 is thereby obtained (see FIG. 1D). A heating temperature of lower than 290° C. is not preferred because the reactivity of the brazing material (Au—Sn sheet) is low. A heating temperature of higher than 420° C. is not preferred because the amount of a reaction product increases and residual stress increases due to an increase in the difference in thermal expansion and an increase in Young's modulus, causing cracking or a reduction in strength.

The above-described joined body 10 including the ceramic member and the metallic member joined together has sufficiently high strength. The reason for this may be as follows. To join the ceramic member 12 and the terminal 14 together, the use of the joint layer 16 containing Au, Sn, Ag, Cu, and Ti is considered to be preferable. In the joint layer 16, its joint interface with the ceramic member 12 is Ti-rich. Therefore, Ti and the ceramic are reacted at the joint interface, and this may play a role in anchoring the joint layer 16 firmly to the ceramic member 12. Moreover, since the porosity is 0.1 to 15%, the strength is high at the beginning and also after thermal cycles, and the occurrence of cracking can be prevented.

The present invention is not limited to the above embodiment. It is appreciated that the present invention can be embodied in various modes so long as these are within the technical scope of the present invention.

For example, in the above embodiment, the ceramic member 12 used may include an electrode that is embedded therein such that a conductive member electrically connected to the electrode is exposed at the bottom surface of the recess 12a, and the terminal 14 may be joined to the conductive member through the joint layer 16. In this case, the terminal 14 is used to supply electricity to the electrode. Examples of the electrode include heater electrodes (resistance heating elements), electrodes for electrostatic chucks, and electrodes for plasma generation.

EXAMPLES

Representative Example

An alumina ceramic member having a recess (terminal hole) with a diameter of 6 mm and a depth of 0.5 mm was prepared. A portion around the recess of the alumina ceramic member was masked with masking tape, and a Ag—Cu—Ti paste was applied to the side and bottom surfaces of the recess using a dispenser. After completion of the application, the Ag—Cu—Ti paste was allowed to stand for 10 minutes and then dried in a clean oven at 120° C. (the temperature of the paste) for 1 hour. Then the masking tape was removed, and baking was performed at a firing temperature of 850° C. and a vacuum of $5 \times 10^{-5}$ Torr or less for a firing time of 10 minutes. A Ag—Cu—Ti metallized layer was thereby famed on the side and bottom surfaces of the recess. The thickness of the metallized layer was 30 μm. The Ti content in the Ag—Cu—Ti paste was 1.7 wt %.

Next, the recess was wiped with acetone and blown with $N_2$. Then a Au—Sn sheet having a diameter of 5.5 mm and a thickness of 0.15 mm was placed on the bottom surface of the recess. A Mo-made terminal (diameter: 5.8 mm, thickness: 6 mm) having a Ni coating was placed on the Au—Sn sheet. A weight was placed on the terminal, and the terminal was leveled and aligned. Then the resulting alumina ceramic member and terminal were treated at a firing temperature of 350° C. and a vacuum of $5 \times 10^{-5}$ Torr or lower for a firing time of 10 minutes. A joined body was thereby obtained. In this joined body, a joint layer in which the metallized layer and the Au—Sn sheet were mixed and integrated together was formed between the terminal and the alumina ceramic member. The joint layer was in contact with the side and bottom surfaces of the recess.

Figure 2:
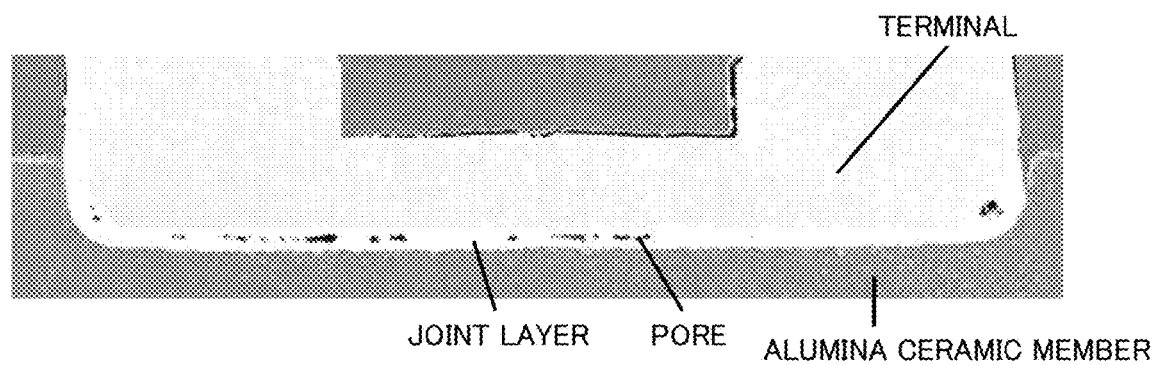
FIG. 2 shows a photograph of a cross section of a joined body in a Representative Example when the joined body is cut in its thickness direction.

The constituent elements of the joint layer were analyzed by EPMA, and the joint layer was found to contain Au, Sn, Ag, Cu, and Ti. In the joint layer, its joint interface with the alumina ceramic member was Ti-rich. Specifically, observation of a Ti mapping image of a cross section of the joined body obtained by cutting the joined body in its thickness direction showed that a Ti layer was present at the interface between the alumina ceramic member and the joint layer and aggregation of Ti was found around pores. The reason that the Ti layer was present at the interface between the alumina ceramic member and the joint layer is that Ti reacted with alumina. The Ti layer may serve to anchor the joint layer to the alumina ceramic me-lather. Small pores were distributed in the joint layer, and the porosity was 5.9%. The porosity was defined as follows. A cross section of the joint layer was binarized, and dark portions were regarded as the cross sections of pores. Then the ratio of the total cross sectional area of the pores to the cross sectional area of the joint layer was used as the porosity. A photograph of the cross section of the joint layer is shown in FIG. 2. The binarization was performed using HALCON 11.0 (HALCON is registered trademark of MVTec Software GmbH).

[Thickness of Metallized Layer]

Joined bodies were manufactured as in the above Representative Example. Each joined body was manufactured such that the thickness of the metallized layer formed in the recess was one of the values shown in Table 1. The fracture strength of each of the joined bodies manufactured was measured, and whether or not cracking occurred in the alumina ceramic member of the joined body immediately after joining was checked. The results are shown in Table 1. The fracture strength is the same as a tensile fracture load. The fracture strength of a joined body was determined as follows. The joined body was firmly fixed to a support with the alumina ceramic member facing down such that the joined body did not move vertically, and an end of a drawbar was screwed into a threaded hole that was formed in the terminal so as to extend from its upper surface vertically downward. An upward vertical load was applied to the drawbar, and the load when the joint layer was fractured was used as the fracture strength.

Cracking indicators in Table 1 mean the following. A: No cracking was found. B: Cracking was found, but the degree of cracking was small, and the cracking did not influence joint properties. C: Cracking was found and its influence was fatal.

TABLE 1

| Thickness of Metallized Layer (µm) | Fracture Strength (kgf) | Cracking |
|---|---|---|
| 0 | 0 | — |
| 2 | 47 | A |
| 3 | 91 | A |
| 5 | 142 | A |
| 10 | 158 | A |
| 30 | 172 | A |
| 50 | 161 | A |
| 75 | 142 | A |
| 80 | 98 | A |

As is clear from Table 1, when the thickness of the metallized layer formed in the recess was 2 to 80 µm, the fracture strength was high, i.e., 50 kgf or more, and no cracking occurred. Particularly, when the thickness was 5 to 75 µm, the fracture strength was higher (140 kgf or more). Instead of applying the Ag—Cu—Ti paste in the above Representative Example, a Ag—Cu—Ti sheet was used to form a metallized layer only on the bottom surface. In this case, cracking occurred even when the thickness of the Metallized layer was 25 µm. This indicates that the metallized layer must be formed not only on the bottom surface of the recess but also on at least part of the side surface. It was also found that, when the thickness of the metallized layer was 2 to 80 µm and preferably 5 to 75 µm, the fracture strength was high and no cracking occurred. If the thickness of the metalized layer is less than 2 µm, the amount of the metallized layer formed on the alumina ceramic member is insufficient, and the strength becomes low. If the thickness of the metalized layer exceeds 80 µm, cracking occurs, causing a reduction in strength. When the thickness of the metallized layer was 2 to 80 µm, the joint interface between the joint layer and the alumina ceramic member was Ti-rich.

[Porosity]

Joined bodies were manufactured as in the above Representative Example. Each joined body was manufactured so as to have a porosity of 0 to 35% by controlling the content of Ti in the Ag—Cu—Ti paste as shown in Table 2. For each of the joined bodies, the fracture strength at the beginning was measured, and the presence or absence of cracking at the beginning was checked. After a thermal cycle test, the fracture strength of each joined body was measured, and the presence or absence of cracking was checked. In the thermal cycle test, an operational cycle including heating from room temperature to 200° C. and subsequent cooling to room temperature was repeated 1,000 times. The results are shown in Table 2.

The test was performed once on an example in which a paste with a Ti content of 0% was used, twice on examples in which a paste with a Ti content of 0.5% or 15% was used, and three times on examples using other pastes.

Cracking indicators in Table 2 mean the following. A: No cracking was found. B: Cracking was found, but the degree of cracking was small, and the cracking did not influence joint properties. C: Cracking was found and its influence was fatal.

TABLE 2

| Ti in Ag—Cu—Ti Paste[X-1] (wt %) | Porosity (%) | Begining Property | | After Thermal Cycle | |
|---|---|---|---|---|---|
| | | Strength (kgf) | Cracking | Strength (kgf) | Cracking |
| 0 | — | 0 | — | — | — |
| 0.50 | — | 31 | C | — | — |
| | — | 77 | C | — | — |
| 1.00 | 0 | 138 | B | 77 | B |
| | 0.1 | 155 | A | 112 | B |
| | 0.1 | 142 | A | 131 | A |
| 1.50 | 0.2 | 163 | A | 164 | A |
| | 3.3 | 171 | A | 177 | A |
| 1.80 | 3.1 | 168 | A | 180 | A |
| | 4.8 | 156 | A | 173 | A |
| | 8.9 | 170 | A | 163 | A |
| 2.10 | 4.9 | 151 | A | 171 | A |
| | 11.2 | 168 | A | 163 | A |
| | 15.7 | 157 | A | 156 | A |
| 2.50 | 21.5 | 71 | A | 73 | A |
| | 24.6 | 69 | A | 81 | A |
| | 26.9 | 92 | A | 69 | A |

TABLE 2-continued

| Ti in Ag—Cu—Ti Paste[X.1] (wt %) | Porosity (%) | Begining Property Strength (kgf) | Cracking | After Thermal Cycle Strength (kgf) | Cracking |
|---|---|---|---|---|---|
| 3.50 | 28.9 | 41 | A | — | — |
|  | 31.1 | 39 | A | — | — |
|  | 33.3 | 52 | A | — | — |

[X.1]The paste includes 61.50~65.50 wt % of Ag and 22.70~26.70 wt % of Cu.

As is clear from Table 2, in each joined body including a joint layer with a porosity of 0.1 to 15% (mainly in joined bodies manufactured using a Ag—Cu—Ti paste with a Ti content of 1.50 to 2.10 wt %), the fracture strength at the beginning and also the fracture strength after the thermal cycles were high, i.e., 150 kgf or more, and no cracking was found at the beginning and also after the thermal cycles. In each joined body having a joint layer with a porosity of 0.1 to 15%, the joint interface between the joint layer and the alumina ceramic member was Ti-rich, as in the Representative Example. It was also confirmed that each joint layer having a porosity of 0.1 to 15% contained Au, Sn, Ag, Cu, and Ti, as in the Representative Example.

A joined body was manufactured in the same manner as in the above Representative Example except that an aluminum nitride ceramic member was used instead of the alumina ceramic member used in the above Representative Example, a Mo terminal having a Au coating was used instead of the Mo terminal having the Ni coating, and the content of Ti in the Ag—Cu—Ti paste was changed to 1.8 wt %. The thickness of the metallized layer was 30 μm. Also in this joined body, a joint layer in which the metallized layer and the Au—Sn sheet were mixed and integrated together was formed between the terminal and the ceramic member. In the joint layer, its joint interface with the ceramic member was Ti-rich. The porosity was 3.1%. In this joined body, the fracture strength immediately after manufacturing and the fracture strength after the thermal cycle test were 167 kgf and 172 kgf, respectively, and the strength of the joined body was sufficient. No cracking was found immediately after manufacturing and also after the thermal cycle test. The reason that these results were obtained is that, with the aluminum nitride ceramic, as with the alumina ceramic, the joint interface between the joint layer and the ceramic member was Ti-rich and the wettability of the Au coating to the joint layer was good, as was that of the Ni coating.

A joined body was manufactured in the same manner as in the above Representative Example except that a Ti terminal having a Ni coating was used instead of the Mo terminal having the Ni coating used in the above Representative Example and the content of Ti in the Ag—Cu—Ti paste was changed to 1.8 wt %. The thickness of the metallized layer was 30 μm. Also in this joined body, a joint layer in which the metallized layer and the Au—Sn sheet were mixed and integrated together was formed between the terminal and the ceramic member. In the joint layer, its joint interface with the ceramic member was Ti-rich. The porosity was 4.1%. In this joined body, the fracture strength immediately after manufacturing and the fracture strength after the thermal cycle test were 165 kgf and 177 kgf, respectively, and the strength of the joined body was sufficient. No cracking was found immediately after manufacturing and also after the thermal cycle test.

The present application claims priority from Japanese Patent Application No. 2014-93587 filed on Apr. 30, 2014, the entire contents of which are incorporated herein by reference.

It will be appreciated that the above-described Examples do not limit the present invention.

What is claimed is:

1. A joined body comprising:
   a ceramic member made of alumina or aluminum nitride and having a recess; and
   a Mo- or Ti-made metallic member having a Ni coating, a Au coating, or a Ni—Au coating, with Ni serving as a base for Au, and joined to the recess of the ceramic member through a joint layer;
   wherein the joint layer is formed using a paste that contains 1.50 to 2.10 wt % of Ti,
   the joint layer contains Au, Sn, Ag, Cu, and Ti and is in contact with a bottom surface of the recess and with at least part of a side surface of the recess,
   in the joint layer, a joint interface with the ceramic member is Ti-rich,
   pores are distributed in the joint layer,
   a cross-sectional area of the joined body in a thickness direction has a ratio of the total cross-sectional area of the pores to the total cross-sectional area of the joint layer of 0.2 to 15.7%, and
   wherein a fracture strength of the joined body is from 156 kgf to 180 kgf after performing a thermal cycle test that includes heating the joined body from room temperature to 200° C. and then cooling the joined body to room temperature, and repeating 1,000 times.

2. The joined body according to claim 1, wherein Ti is aggregated around the pores present inside the joint layer.

3. A method for manufacturing the joined body of claim 1 comprising the steps of:
   (a) preparing a ceramic member made of alumina or aluminum nitride and having a recess;
   (b) applying a Ag—Cu—Ti paste to a bottom surface of the recess and at least part of a side surface of the recess and heating the resulting ceramic member to 800° C. to 900° C. in a vacuum atmosphere to thereby form a metallized layer on the bottom surface of the recess and the at least part of the side surface of the recess; and
   (c) placing a Au—Sn sheet on the bottom surface of the recess with the metallized layer formed thereon, placing a Mo- or Ti-made metallic member having a Ni coating, a Au coating, or a Ni—Au coating, with Ni serving as a base, on the Au—Sn sheet, and heating the resulting ceramic member and the metallic member to 290 to 420° C. in a vacuum atmosphere to thereby form, between the metallic member and the ceramic member, a joint layer which is formed with the metallized layer and the Au—Sn sheet.

4. The method for manufacturing the joined body according to claim 3, wherein in the step (b), the metallized layer has a thickness of 5 to 75 μm.

5. The method for manufacturing the joined body according to claim 3, wherein Ti contained in the joint layer is aggregated around the pores present inside the joint layer.

* * * * *